R. W. ADAMS & J. A. CURREY.
CUTTER FOR RIBBED METAL LATH.
APPLICATION FILED MAY 1, 1912.
1,044,966.
Patented Nov. 19, 1912.
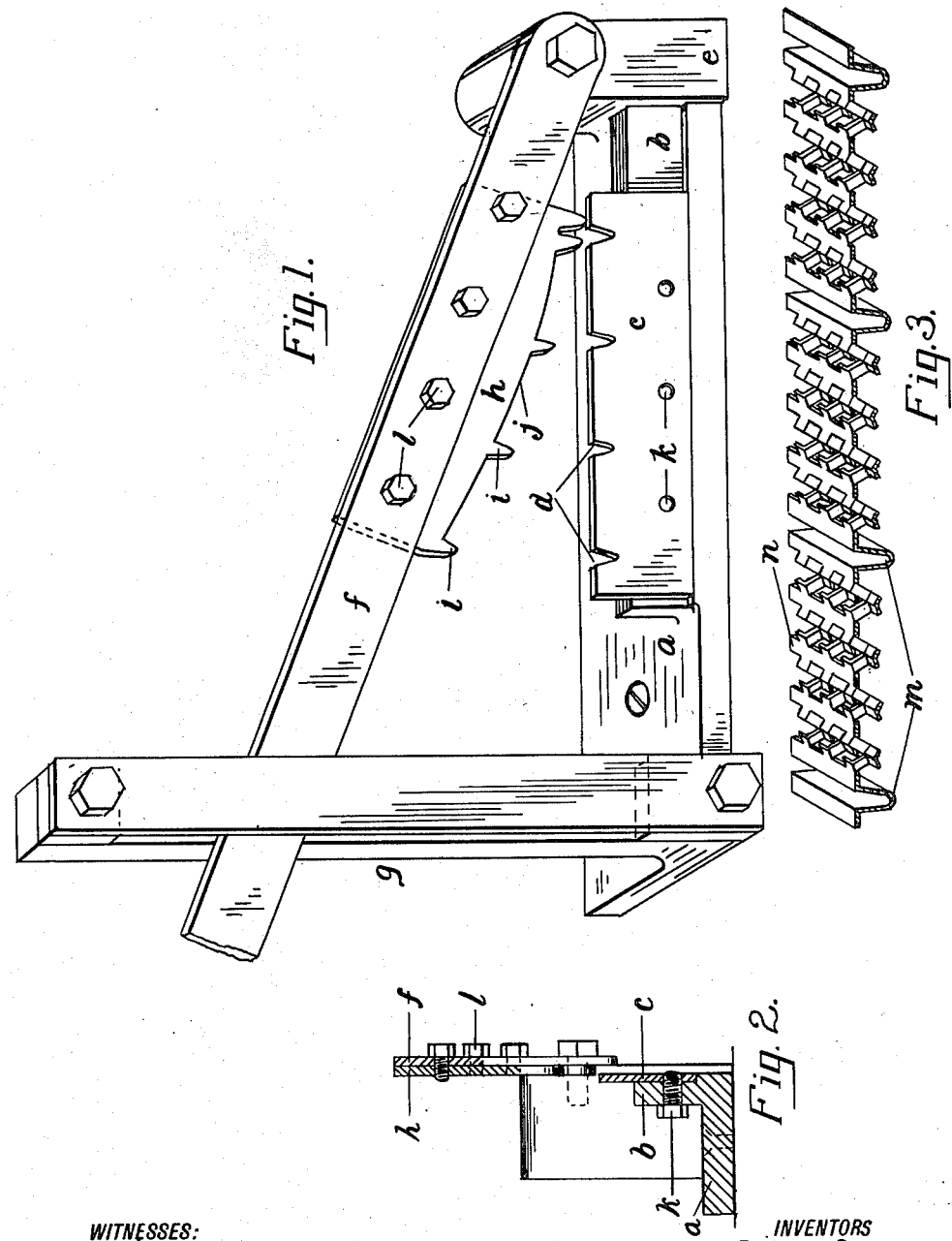
WITNESSES:
INVENTORS
Jesse Albert Currey
Ralph W. Adams
BY
ATTORNEY

UNITED STATES PATENT OFFICE.

RALPH W. ADAMS, OF SPOKANE, WASHINGTON, AND JESSE ALBERT CURREY, OF PORTLAND, OREGON.

CUTTER FOR RIBBED METAL LATH.

1,044,966.  Specification of Letters Patent.  Patented Nov. 19, 1912.

Application filed May 1, 1912. Serial No. 694,594.

*To all whom it may concern:*

Be it known that we, RALPH W. ADAMS and JESSE ALBERT CURREY, citizens of the United States, and residents, respectively, of Spokane, county of Spokane, State of Washington, and Portland, county of Multnomah, State of Oregon, have invented a new and useful Improvement in Cutters for Ribbed Metal Lath, of which the following is a specification.

This application being intended as a revival and completion of the application heretofore filed by the above named applicants for an improvement in cutter for ribbed metal lath, filed July 12, 1909, Serial No. 507,241.

This invention has for its object to provide an improved means for shearing or cutting, into suitable lengths, metal lath having transverse ribs or protruding creases along its length, and particularly such material as is commercially known by the name of "Hy-Rib", without crushing such ribbed portions in the operation; and to this end our invention comprises a pair of pivotally related shear blades provided, respectively, with recesses and corresponding projections at their cutting edges, located and adapted to receive and cut through such ribbed portions without crushing them.

In the drawings: Figure 1 is a perspective view of our device; Fig. 2 is a cross section through the shearing portions of our device; and Fig. 3 shows a section of the material above referred to as "Hy-Rib".

The base, $a$, is adapted to be affixed to some table, and is provided with a flange, $b$, adapted to have removably affixed thereto, by screws, $k$, a shear blade $c$, made with recesses or notches, $d$, in its cutting edge. The base, $a$, is further provided with a hinge-lug $e$, to which is hinged a lever $f$, the front end of which projects through a perpendicular guide $g$, also supported on the base $a$. To the lever $f$ is removably attached, by screws $l$, a shear blade $h$, made with projections, $i$, on its cutting edge $j$, which register with the recesses $d$ of the blade $c$.

The related recesses and projections, $d$, $i$, will, of course, have to be located to suit the locations of the protruding cross ribs of the particular "Hy-Rib" material to be cut. In practice the "Hy-Rib" material is laid on the blade $c$ with the transverse ribs $m$ in the recesses $d$, and in the downward movement of the lever $f$ the projections, $i$, and the blade $h$, will enter the hollow of the rib portions lying in said recesses and support the walls of the rib against being collapsed or crushed during the shearing action. The cutting edge $j$ is made convex so as to facilitate the shearing action. In other words, the convex shape of the cutting edge of the upper blade introduces a special feature. It causes the cutting projections $i$ of such blade, when entering the depressions $d$ of the blade $c$, to have a sort of rolling motion, facilitating the cutting of the walls of the protruding portions $m$ of the lath material, like a pair of shears instead of like a chisel.

The blades, $c$, $h$, are made removable, so that the same cutter may be used to cut different styles or types of metal lath, by simply substituting suitable shearing blades having the general properties described above.

We claim:

1. In a cutter for ribbed metal lath, the combination of a base and a lever pivoted thereto, a shear-blade on the base, such shear-blade formed with recesses in its cutting edge adapted to receive the protruding portions of the material to be cut, a shear-blade on said lever, such shear-blade formed with projections corresponding with said recesses of the shear-blade of the base, and its cutting edge being convex, whereby a rolling motion is imparted to its said projections when entering said recesses and cutting the portions of the material therein seated.

2. In a cutter for ribbed metal lath, the combination of a base and a lever pivoted thereto, a shear-blade removably fastened to the base, such shear-blade formed with recesses in its cutting edge adapted to receive the protruding portions of the material to be cut, a shear-blade removably fastened to said lever, such shear-blade formed with projections corresponding with said recesses of the shear-blade of the base, and its cutting edge being convex, whereby a rolling motion is imparted to its said projections when entering said recesses and cutting the portions of the material therein seated.

RALPH W. ADAMS.
JESSE ALBERT CURREY.

Witnesses:
FRED A. STOLZ,
CECIL LONG.